Sept. 29, 1953   K. F. HAGER ET AL   2,653,889
BUBBLING REDUCTION FOR HIGH TEMPERATURE RESISTING BONDING
Filed Sept. 14, 1951
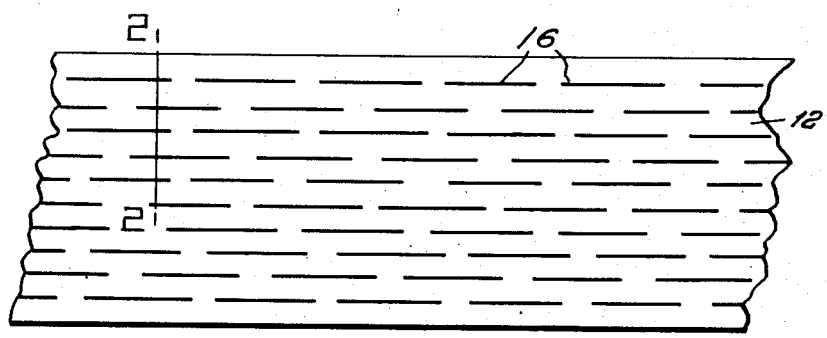
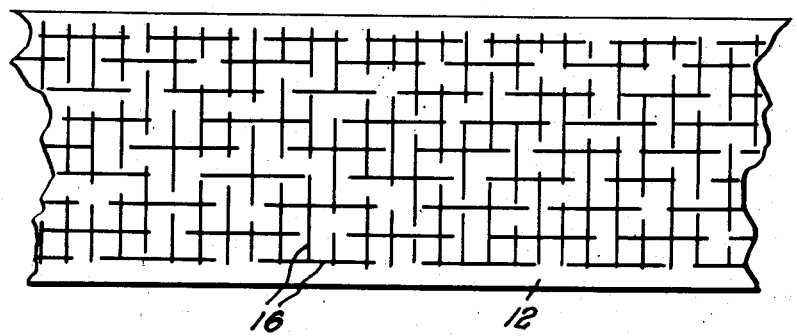
Inventors
Karl F. Hager
Hans I. Lindenmayr
Morris Rosenthal
By G. J. Kessenich + A. W. Dew
Attorneys Patented Sept. 29, 1953

2,653,889

UNITED STATES PATENT OFFICE 2,653,889

BUBBLING REDUCTION FOR HIGH TEMPERATURE RESISTING BONDING

Karl F. Hager and Hans I. Lindenmayr, Huntsville, Ala., and Morris Rosenthal, El Paso, Tex.; said Rosenthal assignor to General Electric Company, a corporation of New York; said Hager and said Lindenmayr assignors to the United States of America as represented by the Secretary of the Army Application September 14, 1951, Serial No. 246,666

24 Claims. (Cl. 154—125)

1

This invention relates to the reduction of buckling or bubbling of bonded surfaces occurring with an adhesive at high temperatures.

In many cases where protection is desired against the passage of heat from a source through a wall, a highly reflective surface applied to the wall has been found efficient in radiating heat away from the wall. Application of highly reflective metal foils to the walls has been found suitable for increasing heat radiation. Two of the present inventors have disclosed in a co-pending patent application, that certain silicone resins are efficient adhesives between metals. These bonding agents still retain enough strength to bond foils such as aluminum foil at temperatures up to 450° C. At the highest temperatures small bubbles or blisters appear in the foil. This bubbling seems to be due either to the generation and release of volatile products or to differences between the coefficient of expansion of the bonded surfaces. It can be reduced by allowing the resin to set under pressure. Application of pressure is not always possible. Accordingly the primary object of our invention is to develop means for decreasing bubbling of bonded or laminated materials at high temperatures.

Many blends of silicone resins and other high temperature adhesives have been tried in an attempt to eliminate the bubbling without success. We have found however that cutting grooves or slits into the bonded foils can materially reduce or eliminate bubbling. How we carry out our invention can be seen by reference to the appended drawings in which:

Figure 1 shows a plan-view of one aspect of our invention;

Figure 2 represents a cross-section taken on the line 2—2 of Figure 1; and

Figure 3 represents another from of our invention.

In the drawings the numeral 10 represents a wall of stainless steel or other material to which is bonded a highly reflective aluminum foil surface 12 by means of a high temperature adhesive 14. To prevent buckling or bubbling of the aluminum surface 12 slits or grooves 16 are cut into the foil to break the grain of the surface. These cuts do not need to penetrate through the foil as long as they make deep impressions in it. The bubble size decreases with the decrease of uncut foil between the cuts. Cutting vertically or horizontally alone decreases bubble size considerably, but cross-cutting the foil produces an even greater decrease in bubble size, in depth as well as in area. The bubbles become very small as the space between cuts approaches the infinitesimal. A conical wall gives a greater amount of bubbling than a flat surface but even on such wall bubbling is reduced by our method.

In one test a stainless steel wall was painted with a heat-resisting silicone resin as the adhesive. To it were applied three strips of degreased and cleaned aluminum foil 0.001 inch thick. Two of the strips, after being adhered to the painted stainless steel wall, had slits cut into them by means of a razor blade. The third strip was smoothed down uncut.

The temperature of the wall was raised to 400° C. for an hour. Upon cooling the unslitted strip exhibited bubbles of relatively large area and depth. The bubbles on the slitted strips were much smaller. In most instances the size of the bubble decreased with a decrease in space between slits.

In another test a stainless steel wall was painted with the same heat resisting silicone resin adhesive used before. Several 4' x 6" strips of 0.001" aluminum foil were bonded to the wall. After the bonding many grooves were deeply impressed in the foil in such a manner as to cross each other. The grooves were not continuous and were set together more closely than in previous experiments. After the wall was heated to 400–450° C. for an hour the bubbles found were much smaller than those obtained previously. These results emphasize the fact that the smaller the space between cuts in the foil, the smaller are the bubbles. Tests in this case also showed a decrease in the amount of heat transfer through the wall.

What we claim is:

1. A heat resistant laminate comprising a non-porous metal base material, an adhesive effective at high temperatures painted on the surface of said base metal, and a metal foil bonded to the base material by the adhesive, said metal foil having grooves formed in its surface to prevent bubbling of the foil.

2. A metallic wall having low heat transfer characteristics comprising a stainless sheet steel base, a silicone adhesive resistant to high temperatures painted on said steel base, and highly reflective aluminum foil bound to the steel by means of the adhesive, said aluminum foil carrying close-set criss-crossing grooves cut deeply into its exposed surface whereby bubbling thereof is inhibited.

3. As an article of manufacture, a stainless steel sheet, a sheet of aluminum foil having closely-spaced intersecting grooves in one surface thereof, and a silicone adhesive resistant to high temperature bonding the other surface of said foil to a face of said sheet, whereby buckling of the foil is inhibited.

4. The method of forming a high heat reflecting laminate having bubbling and blistering inhibited characteristics at high temperatures which comprises painting a non-porous surface with a heat-resisting silicone resin, applying a highly reflective aluminum foil to said painted surface to form said laminate, cutting deep grooves in said foil, and heating the resulting laminate to high temperatures to effect adhesion of said grooved foil to said non-porous surface.

5. The method of claim 4 in which said grooves are continuous.

6. The method of claim 4 in which said grooves are discontinuous.

7. The method of claim 4 in which said grooves form slits extending through said foil.

8. The method of forming a high heat reflective wall having bubbling and blistering inhibited characteristics at high temperatures which comprises, painting a non-porous surface with a heat-resisting silicone resin, applying a highly reflective aluminum foil 0.001" thick to said painted surface to form said wall, cutting deep grooves in said foil, and heating the resulting wall to high temperatures to effect adhesion of said grooved foil to said non-porous surface.

9. The method of claim 8 in which said grooves are continuous.

10. The method of claim 8 in which said grooves are discontinuous.

11. The method of claim 8 in which said grooves form slits extending through said foil.

12. The method of forming a high heat reflective wall having bubbling and blistering inhibited characteristics at high temperatures which comprises, painting a non-porous surface with a high heat resisting silicone resin, applying a highly reflective aluminum foil to said painted surface to form said wall, cutting deep grooves in said foil, and heating the resulting wall to 400° C. for one hour to effect adhesion of said grooved foil to said non-porous surface.

13. The method of claim 12 in which said grooves are continuous.

14. The method of claim 12 in which said grooves are discontinuous.

15. The method of claim 12 in which said grooves form slits extending through said foil.

16. The method of forming a high heat reflective laminate having bubbling and blistering inhibited characteristics at high temperatures which comprises, painting a non-porous surface with a high heat-resisting silicone resin, applying a highly reflective aluminum foil to said painted surface to form said laminate, cutting deep grooves in said foil, and heating the resulting laminate to 400–450° C. for one hour to effect adhesion of said grooved foil to said non-porous surface.

17. The method of claim 16 in which said grooves are continuous.

18. The method of claim 16 in which said grooves are discontinuous.

19. The method of claim 16 in which said grooves form slits extending through said foil.

20. The method of forming a high heat reflective laminate having bubbling and blistering inhibited characteristics at high temperatures which comprises painting a stainless steel wall with a high heat-resisting silicone resin, applying a highly reflective aluminum foil to said painted wall to form said laminate, cutting deep grooves in said foil, and heating said laminate to high temperatures to effect adhesion of said grooved foil to said wall.

21. The method of claim 20 in which said grooves are continuous.

22. The method of claim 20 in which said grooves are discontinuous.

23. The method of claim 20 in which said grooves form slits extending through said foil.

24. The method of forming a high heat reflective laminate having bubbling and blistering inhibited characteristics at high temperatures which comprises, painting a non-porous metal wall with a high heat resisting adhesive, applying a highly reflective metal foil to said painted wall to form said laminate, cutting deep grooves in said foil, and heating said laminate to high temperature to effect adhesion of said grooved foil to said metal wall.

KARL F. HAGER.
HANS I. LINDENMAYR.
MORRIS ROSENTHAL.

References Cited in the file of this patent

UNITED STATES PATENTS

| Number | Name | Date |
| --- | --- | --- |
| 1,609,222 | Taylor | Nov. 30, 1926 |
| 2,003,494 | Reynolds | June 4, 1935 |
| 2,007,883 | Spahn | July 9, 1935 |
| 2,336,852 | Elmendorf | Dec. 14, 1943 |
| 2,568,458 | Nichols | Sept. 18, 1951 |